Feb. 7, 1933.  H. GEISENHONER  1,896,705
TAKE-UP DEVICE FOR ROPES
Filed April 1, 1932

Inventor:
Henry Geisenhoner,
by William G. Gartner
Attorney.

Patented Feb. 7, 1933

1,896,705

UNITED STATES PATENT OFFICE

HENRY GEISENHONER, OF SCHENECTADY, NEW YORK

TAKE-UP DEVICE FOR ROPES

Application filed April 1, 1932. Serial No. 602,463.

The present invention comprises an improved device for adjusting the tautness of clothes lines, tent ropes, or the like, whereby, on the one hand, a ready adjustment or take-up of line may be secured, and, on the other hand, a line may just as readily be released without the exercise of unusual force.

Devices heretofore employed to take up slack in lines have been constructed to grip the line by wedging it between metal parts. Not only is it hard to disengage a line from such a device but also the part of a line so held by wedging is damaged and eventually so worn as to be parted.

In accordance with my invention I have provided an improved device whereby the ends of a line are frictionally held by parts of the line itself without damage. My improved device also provides for a structure whereby a line may be shortened readily by being wound over a hub of the device which is arranged to be locked to prevent its being unwound while being unlocked or loosened by a simple pull.

The novel features of my invention will be pointed out with greater particularity in the appended claims. For a clear understanding of my invention reference may be had to the accompanying drawing taken in connection with the following description.

Figure 1:
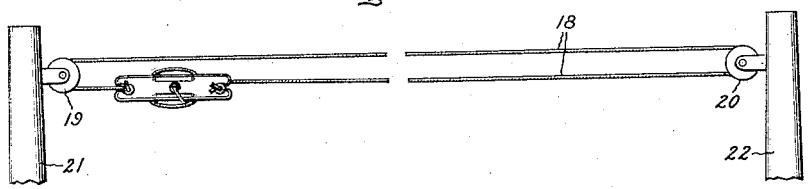
Figure 2:
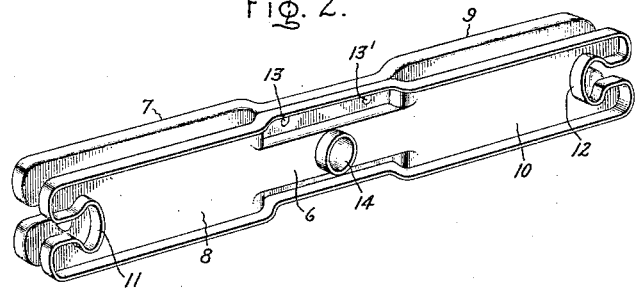
Figure 3:
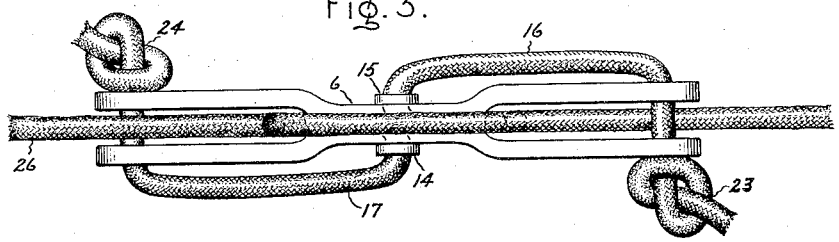
Figure 4:
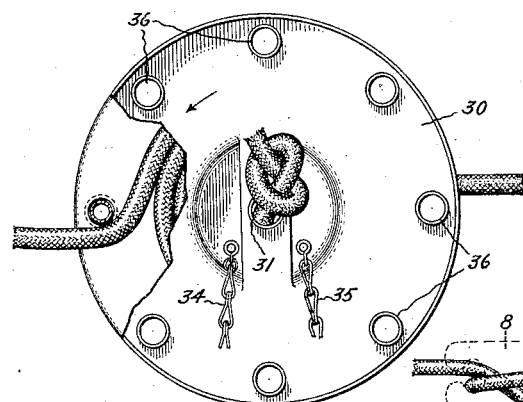
Figure 5:
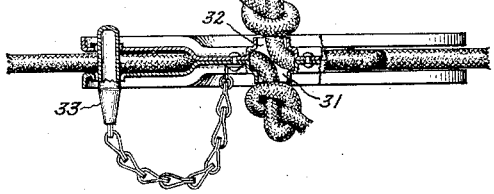

Fig. 1 is a side elevation of a short length of pulley line upon which my improved device is mounted; Fig. 2 is a perspective view of a preferred form of my invention; Fig. 3 is a top view of such device with the ends of a clothes line threaded therethrough; Figs. 4 and 5 respectively are side and end views of a modification which embodies my invention; and Fig. 6 is a side view of the wound portion of the line showing how the line ends are wound on one another when the take-up device is used to render the line taut.

Figure 6:
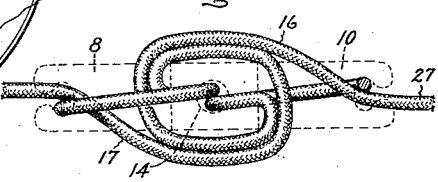

The device shown in Figs. 2, 3 and 6, consists of a hub portion 6 from which extend in opposite directions two pairs of flat substantially parallel plates 7, 8 and 9, 10 having reentrant slots or notches at their ends as indicated at 11, 12 for the plates 8, 10. These notches preferably are widest at their base portion, the necks, however, being wide enough to admit a line or rope for which such a device is to be used. The hub and bifurcated side plates may be made of sheet metal, such as iron, and conveniently are made of two parts riveted together as indicated at 13, 13′. The hub portion 6 has two right-angled passages 14, 15 extending therethrough which are large enough to receive the two ends 16, 17 of a line or rope.

As shown in Fig. 1, such a line 18 may pass over pulleys 19, 20 which are supported on posts 21, 22. While the ends 16, 17 of the line may be knotted, as indicated at 23, 24, Fig. 3, to prevent accidental withdrawal when the line has been slackened, the line in its taut state, as shown in Fig. 1, is held in position by the action of the take-up device as will now be described.

Assuming the two line ends 16, 17 to have been threaded through the passages 14, 15 respectively so as to extend in opposite directions, the line may be tightened by winding the ends 16, 17 of the line on the hub 6 as diagrammatically indicated by Fig. 6. The pull of the lines from opposite directions, of course, would immediately loosen the line by causing the wound-up portion to unwind. To prevent such unwinding the line ends 15, 16 are interposed by being slipped into the notches 11, 12.

As a consequence of this construction the line is prevented from loosening by the friction of the wound-up portion and the friction of the ends 16, 17 which must move past one another in order to loosen the line. Should it be desired to loosen the line, the ends 16 and 17 each by a simple pull may be disengaged from the notches in which they are held causing the wound-up portions of the line to unwind.

In the device shown in Figs. 4 and 5 a circular reel 30 is provided having passages 31, 32 through which the ends of the line are threaded similarly to arrangement described above in connection with Figs. 2 and 3. The reel 30 is provided with pins 33 (only one being shown) supported on chains 34, 35. The periphery of the reel 30 is provided with spaced holes 36, into which the pins 33 may be placed to lock the reel against rotation when the line has been made taut by being wound on the reel. While being so wound, a pull on the line tending to loosen it, as for example, the blowing of the wind on wash mounted on the line, must overcome the friction of the successive turns of the line wound on one another.

What I claim as new and desire to secure by Letters Patent of the United States is:

1. A take-up device for a clothes line or the like comprising a rotatable member providing a winding surface upon which said line may be wound to shorten the same, and having passages therein adjacent its center of rotation through which portions of said line adjacent the ends thereof may pass in position to be wound on said surface, and means providing retaining walls spaced substantially the width of lines intended for use with said device for keeping a wound-up portion of said line in position upon said winding surface and having holes near the periphery of said walls in which may be retained holding means for securing a wound-up portion of said line against unwinding.

2. A take-up device for a clothes line or the like comprising a member having a hub portion having a passage of such size that two ends of a clothes line will pass therethrough with frictional resistance, and bifurcated members extending outwardly from said hub portion, said bifurcated members having notches near their ends adapted to receive the loose ends of said line, whereby such loose ends may be used to prevent unwinding of said hub when said line has been tightened by winding thereon.

In witness whereof I have hereunto set my hand.

HENRY GEISENHONER.